United States Patent
Runyan

(10) Patent No.: US 11,541,581 B2
(45) Date of Patent: Jan. 3, 2023

(54) INJECTION MOLDED COLD-EXPANSION COMPRESSION COLLAR

(71) Applicant: Zurn Industries, LLC, Milwaukee, WI (US)

(72) Inventor: Gary L. Runyan, Plano, TX (US)

(73) Assignee: Zurn Industries, LLC, Milwaukee, WI (US)

( * ) Notice: Subject to any disclaimer, the term of this patent is extended or adjusted under 35 U.S.C. 154(b) by 508 days.

(21) Appl. No.: 15/687,106

(22) Filed: Aug. 25, 2017

(65) Prior Publication Data

US 2018/0065282 A1  Mar. 8, 2018

Related U.S. Application Data

(60) Provisional application No. 62/383,001, filed on Sep. 2, 2016.

(51) Int. Cl.
*F16L 47/06* (2006.01)
*B29C 45/00* (2006.01)
(Continued)

(52) U.S. Cl.
CPC ...... *B29C 45/0025* (2013.01); *B29C 45/2616* (2013.01); *B29C 45/2708* (2013.01);
(Continued)

(58) Field of Classification Search
CPC ................................ F16L 33/207; F16L 47/06
See application file for complete search history.

(56) References Cited

U.S. PATENT DOCUMENTS 2,433,602 A * 12/1947 Coss ...................... F16L 33/02
                                                        285/242
2,739,829 A    3/1956 Pedlow et al.
(Continued)

FOREIGN PATENT DOCUMENTS

CN          2793501 Y    7/2006
DE          19948597 A1  4/2000
(Continued)

OTHER PUBLICATIONS

Uponor Plumbing System, Uponor Professional Plumbing Installation Guide [online], 2013 [retrieved on Jan. 10, 2022], Retrieved from the Internet:<URL: https://www.gwkent.com/media/pdf/product/4245/AQUAPEX_Install.pdf>.*
(Continued)

*Primary Examiner* — Zachary T Dragicevich
*Assistant Examiner* — James A Linford
(74) *Attorney, Agent, or Firm* — Michael Best & Friedrich LLP

(57) ABSTRACT

A compression collar is manufactured for reinforcing an interference fit between an end of a pipe and a fitting. A precursor form is injection molded using a cold-expansion material. The precursor form has a tubular body with an initially closed axial end and a bore initially blind formed in the other axial end. Material is removed from the initially closed axial end to form an opening that connects to the bore thereby forming the compression collar. The opening has an inner periphery with a profile in axial cross section that is different than any profile in axial cross section of an inner periphery of the bore. The collar formed lacks knitlines and includes tabs which help to position the collar on a pipe.

24 Claims, 6 Drawing Sheets

(51) Int. Cl.
*F16L 47/22* (2006.01)
*B29C 45/26* (2006.01)
*B29C 45/27* (2006.01)
*F16L 33/207* (2006.01)
*B29K 23/00* (2006.01)

(52) U.S. Cl.
CPC ............ *F16L 33/207* (2013.01); *F16L 47/06* (2013.01); *F16L 47/22* (2013.01); *B29C 2045/2714* (2013.01); *B29K 2023/0691* (2013.01)

(56) References Cited

U.S. PATENT DOCUMENTS

| | | | |
|---|---|---|---|
| 2,930,634 A | 3/1960 | Merritt | |
| 2,933,428 A | 4/1960 | Mueller | |
| 3,260,540 A | 7/1966 | Houot | |
| 3,291,670 A | 12/1966 | Usab | |
| 3,567,259 A | 3/1971 | Benson et al. | |
| 3,591,674 A | 7/1971 | Engel | |
| 3,656,783 A | 4/1972 | Reeder | |
| 3,759,553 A | 9/1973 | Carter | |
| 3,887,992 A | 6/1975 | Parmann | |
| 3,972,548 A | 8/1976 | Roseen | |
| 4,036,514 A | 7/1977 | Hannover | |
| 4,070,044 A | 1/1978 | Carrow | |
| 4,305,608 A * | 12/1981 | Stuemky | F16L 33/2076 285/256 |
| 4,408,786 A * | 10/1983 | Stuemky | F16L 33/2076 285/256 |
| 4,682,797 A | 7/1987 | Hildner | |
| 4,997,214 A | 3/1991 | Reese | |
| 5,099,888 A | 3/1992 | Valls, Jr. | |
| 5,254,824 A | 10/1993 | Chamberlain et al. | |
| 5,566,708 A | 10/1996 | Hobbs, Jr. | |
| 5,735,554 A | 4/1998 | Imgam | |
| 5,744,085 A | 4/1998 | Sorberg | |
| 5,829,795 A | 11/1998 | Riesselmann | |
| 5,931,200 A | 8/1999 | Mulvey et al. | |
| 6,159,408 A | 12/2000 | Kitayama et al. | |
| 6,270,125 B1 | 8/2001 | Rowley et al. | |
| 6,367,850 B1 | 4/2002 | Thrift et al. | |
| 6,581,982 B1 | 6/2003 | Nghiem | |
| 6,585,297 B2 | 7/2003 | Mullen, Jr. | |
| 6,783,160 B2 | 8/2004 | Rowley | |
| 6,832,502 B1 | 12/2004 | Whyte et al. | |
| 7,128,560 B2 | 10/2006 | Tandart | |
| 7,364,206 B2 | 4/2008 | Romanelli et al. | |
| 7,370,889 B2 | 5/2008 | Maunder et al. | |
| 7,448,652 B2 | 11/2008 | Poast et al. | |
| 7,654,588 B2 | 2/2010 | Schwalm | |
| 7,744,803 B2 | 6/2010 | Jackson et al. | |
| D623,277 S | 9/2010 | Guzzoni et al. | |
| 7,922,475 B2 | 4/2011 | Gueit | |
| D637,697 S | 5/2011 | Steiner | |
| 7,959,429 B2 | 6/2011 | Munoz De Juan | |
| 8,069,699 B2 | 12/2011 | Glenn et al. | |
| 8,146,225 B2 | 4/2012 | Olinger et al. | |
| 8,211,347 B2 | 7/2012 | Tabanelli | |
| 8,302,448 B2 | 11/2012 | Woelcken et al. | |
| 8,365,382 B2 | 2/2013 | Hedstrom | |
| 8,517,715 B2 | 8/2013 | Thorson et al. | |
| 8,562,331 B2 | 10/2013 | Schramm et al. | |
| 8,745,843 B2 | 6/2014 | Michels et al. | |
| D730,494 S | 5/2015 | Arment et al. | |
| 9,248,617 B2 | 2/2016 | Lundequist et al. | |
| 9,475,965 B2 | 10/2016 | Conrad et al. | |
| 9,625,069 B2 | 4/2017 | Schwager | |
| 9,822,915 B2 * | 11/2017 | Smahl | F16L 47/22 |
| 2003/0212180 A1 | 11/2003 | Rietz et al. | |
| 2003/0230895 A1 | 12/2003 | Brown et al. | |
| 2005/0161939 A1 | 7/2005 | Poll | |
| 2006/0082156 A1 * | 4/2006 | Runyan | F16L 33/025 285/420 |
| 2008/0315579 A1 | 12/2008 | Smahl et al. | |
| 2009/0302602 A1 | 12/2009 | Larsson | |
| 2011/0151045 A1 | 6/2011 | Gueit | |
| 2012/0153614 A1 | 6/2012 | Olinger et al. | |
| 2012/0181727 A1 | 7/2012 | Lindner et al. | |
| 2012/0211978 A1 | 8/2012 | Gardiner | |
| 2012/0217674 A1 | 8/2012 | Greding | |
| 2012/0217743 A1 | 8/2012 | Parisi | |
| 2013/0307260 A1 | 11/2013 | Laakso et al. | |
| 2014/0300107 A1 | 10/2014 | Altenrath | |
| 2014/0338178 A1 | 11/2014 | Lehmann et al. | |
| 2015/0000368 A1 | 1/2015 | Barthlein et al. | |
| 2015/0165507 A1 | 6/2015 | Reese | |
| 2015/0167874 A1 | 6/2015 | Buerli et al. | |
| 2015/0258598 A1 | 9/2015 | Frenken | |
| 2015/0306652 A1 | 10/2015 | Baerthlein et al. | |
| 2016/0008866 A1 | 1/2016 | Houle et al. | |

FOREIGN PATENT DOCUMENTS

| | | |
|---|---|---|
| EP | 0878287 A1 | 11/1998 |
| EP | 0897081 A1 | 2/1999 |
| EP | 0530387 B2 | 10/1999 |
| EP | 0728979 B1 | 5/2000 |
| EP | 1031781 A2 | 8/2000 |
| EP | 1240981 A2 | 9/2002 |
| EP | 1118401 B1 | 3/2004 |
| EP | 1326045 B1 | 2/2005 |
| EP | 1160027 B1 | 4/2005 |
| EP | 1543903 A1 | 6/2005 |
| EP | 1674241 A1 | 6/2006 |
| EP | 1837581 A2 | 9/2007 |
| EP | 1933073 A1 | 6/2008 |
| EP | 2025988 A1 | 2/2009 |
| EP | 2090384 A2 | 8/2009 |
| EP | 2090385 A2 | 8/2009 |
| EP | 2153917 A2 | 2/2010 |
| EP | 2130664 B1 | 7/2011 |
| EP | 2607764 B1 | 1/2015 |
| GB | 1158011 A | 7/1969 |
| GB | 2352665 B | 2/2003 |
| GB | 2371253 B | 4/2004 |
| GB | 2398612 A | 8/2004 |
| WO | 9418486 A1 | 8/1994 |
| WO | 9529360 A1 | 11/1995 |
| WO | 9625255 A1 | 8/1996 |
| WO | 9841790 A1 | 9/1998 |
| WO | 0079172 A1 | 12/2000 |
| WO | 0173330 A2 | 10/2001 |
| WO | 0232597 A1 | 4/2002 |
| WO | 02077510 A1 | 10/2002 |
| WO | 03004917 A1 | 1/2003 |
| WO | 03004918 A1 | 1/2003 |
| WO | 2005046906 A1 | 5/2005 |
| WO | 2007006863 A1 | 1/2007 |
| WO | 2007065955 A1 | 6/2007 |
| WO | 2011128049 A1 | 10/2011 |
| WO | 2014032911 A1 | 3/2014 |
| WO | 2014075//8 A1 | 5/2014 |
| WO | 2014141190 A1 | 9/2014 |
| WO | 2014177435 A1 | 11/2014 |
| WO | 2015162155 A1 | 10/2015 |

OTHER PUBLICATIONS

Uponor, ProPEX Ring [online], Mar. 13, 2008 [retrieved on Jan. 12, 2022], Retrieved from the Internet:<URL: https://sweets.construction.com/swts_content_files/3210/275466.pdf>.*
WIRSBO, Installation Handbook, Radiant Floor, Radiant Ceiling, RADIPEX Baseboard, and Radiator Supply Systems [online], 6th Edition. Aug. 1999 [retrieved on Jan. 12, 2022], Retrieved from the Internet:<URL: http://www.republicsupplyco.com/SpecSheets/HeatInstall6thEd_Hbk1-17.pdf>.*
Office Action issued from the United States Patent Office for U.S. Appl. No. 15/686,758 dated Jan. 6, 2021 (12 Pages).
Huang et al., "Experimental Study and Computer Simulation of the Effect of Spider Shape on the Weld-Lines in Extruded Plastic Pipe",

(56) References Cited

OTHER PUBLICATIONS

Polymer Engineering and Science, Sep. 1998, vol. 38 No. 9, pp. 1506-1522.

* cited by examiner

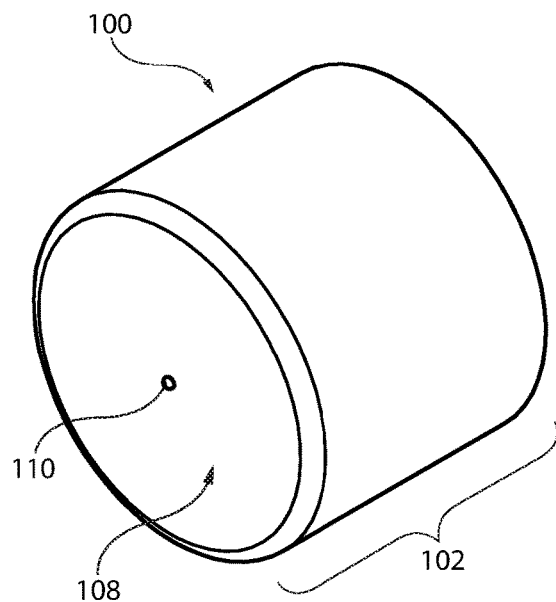
FIG. 1A
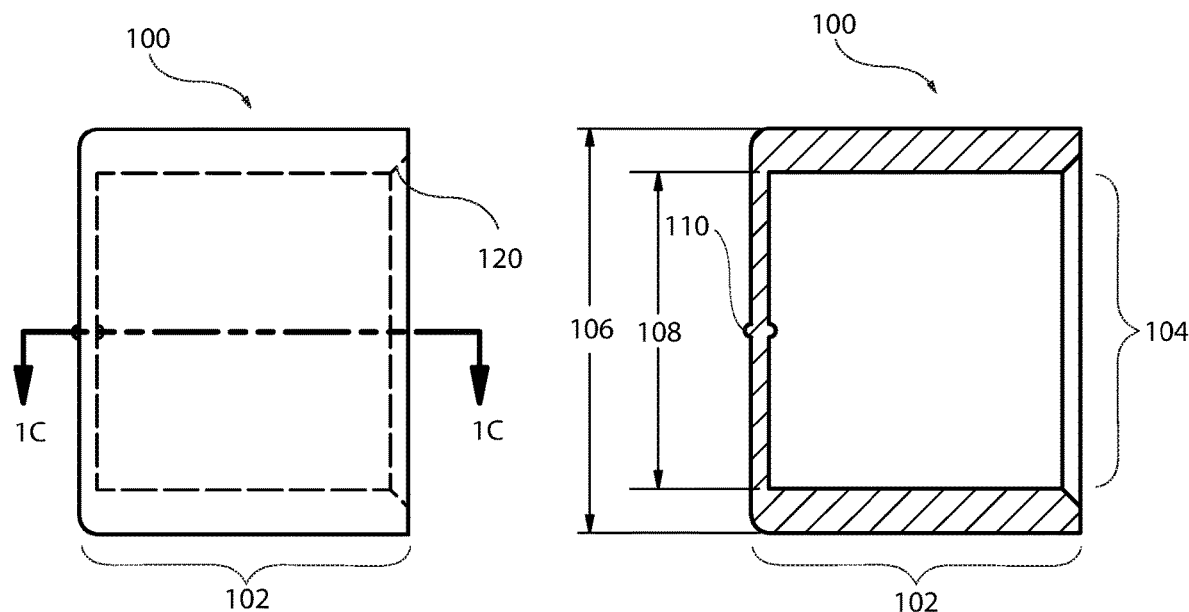
FIG. 1B  FIG. 1C

INJECTION MOLDED COLD-EXPANSION COMPRESSION COLLAR

CROSS-REFERENCE TO RELATED APPLICATION

This application claims the benefit of U.S. Provisional Patent Application No. 62/383,001 entitled "Injection Molded Cold-Expansion Compression Collar" filed Sep. 2, 2016, the contents of which are incorporated by reference herein in its entirety for all purposes.

STATEMENT OF FEDERALLY SPONSORED RESEARCH OR DEVELOPMENT

Not applicable.

BACKGROUND

This disclosure relates, in general, to improvements in cold-expansion compression collars or reinforcing rings for making leak-free tube connections. More particularly, this disclosure relates to a method for making compression collars for cold-expansion tubing connections, such as in piping made from polyolefin, polyethylene, cross-linked polyethylene, PEX-a, PEX-b, PEX-c, PERT, or any other similar material.

Cold-expansion tubing has been used in plumbing applications for decades in Europe and now increasingly in the United States. The principle behind its operation is to manufacture a hollow, tubular material and imbue it with shape memory properties (e.g., through cross-linking, irradiation, steam, etc.) such that when the tubing is stretched or deformed, the tubing returns to the shape set in its memory during the manufacturing process. In use, cold-expansion tubing can be widened or belled at its end and allowed to shrink back to its original shape after mere moments at room temperature. The elastic forces within the cold-expansion tubing material can be applied to any object that interferes with the cold-expansion tubing as it returns to its original shape. Thus, cold-expansion tubing can form interference fits or joints with fittings, other piping, etc.

It is known in the state of the art that such a cold expansion fitting connection between a pipe and a fitting may be further strengthen by placing a compression collar around the end of the pipe or tubing prior to cold expansion. See e.g., U.S. Pat. No. 5,735,554. By forming both the compression collar and the pipe from a cold-expansion material and by placing the compression collar at the axial end of the pipe, both the collar and pipe can be expanded simultaneously, moved over a fitting, and then allowed to return to substantially the same size and shape at room temperature. The addition of compression collar provides additional compressive forces beyond that of just the pipe to create a better seal for the connection and reinforces the interference fit between the pipe and the fitting over which the pipe is received.

However, more so than just the pipe, the compressive collar is subjected to high loads under elastic deformation. Thus, there is a need to attempt to develop compressive collars having more robust structure and increased strength.

SUMMARY

The present disclosure is directed to an improved method of manufacturing compression collars or reinforcing rings for a cold-expansion joining system using injection molding. While injection molding has been used to produce compression collars (see e.g., U.S. Patent Application Publication No. 2008/0315579), such conventional injection molding has been known to introduce knitlines. Knitlines are lines within the injection molded part, often not visible by the naked eye, at which two fronts of material have flowed together during the injection molding process. Such knitlines form weak regions which are more prone to failure than otherwise homogeneous areas of the injection molded collar. To reinforce these lines of inherent weakness, it has been proposed to thicken the wall at the knitlines. See again, U.S. Patent Application Publication No. 2008/0315579.

Disclosed herein is a method of eliminating knitlines altogether in an injection molded compression collar. This elimination of knitlines has the clear advantage of strengthening the part (in comparison to a component having a similar geometry, but with knitlines) and further has the advantage of eliminating thick wall sections which has been proposed by others, thereby reducing material.

To mold a compression collar without knitlines, a continuous gate is utilized at the axial end of a precursor form from which the compression collar will be formed. As such, the injected material flows from the point or points of injection on the axial end, radially outward to the cylindrical walls, and then down the cylindrical walls without the injected material ever flowing into itself. Thus, this continuous gate initially forms a solid wall or capped end at one axial end of the collar which would otherwise be a substantially hollow cylinder. Once the precursor form is injection molded, the excess gate material is removed from the axial end. The removal of excess gate material can be accomplished, for example, through a trimming or punching operation. While it is possible to remove the gate entirely, in some preferred forms, some amount of the axial end wall remains to function as positioning stops or tabs thereby providing a locating mechanism for the compression collar when placed on the end of the piping.

According to one aspect, a method is disclosed for manufacturing a compression collar for reinforcing an interference fit between an end of a pipe and a fitting. A precursor form is injection molded using a cold-expansion material, in which the precursor form comprises a tubular body with an initially closed axial end and a bore that is initially blind formed in the other axial end. Material is removed from the initially closed axial end of the tubular body of the precursor form to form an opening in the initially closed axial end that connects to the bore thereby forming the compression collar. The opening has an inner periphery with a profile in axial cross section that is different than any profile in axial cross section of an inner periphery of the bore.

In many forms, the cold-expansion material may be one or more of a polyolefin, cross-linked polyolefin, polyethylene, cross-linked polyethylene, PEX, PEX-a, PEX-b, PEX-c, and PERT.

In some forms, because of the manner of injection molding and removed material, the compression collar may include no knitlines. It is contemplated that the injection point(s) may be located at the initially closed axial end, for example at the central axis, such that the injected material flows radially outward along the initially closed end and then axially downward along the tubular sidewalls, such that the front of the injected material never substantially flows into itself to form a knitline. In some forms, the step of removing material from the initially closed axial end of the tubular body of the precursor form to form an opening may involves removing any injection points on the precursor form used in the step of injection molding the precursor form.

Although various ways of removing material from the initially closed axial are contemplated, in some forms the step of removing material from the initially closed axial end of the tubular body of the precursor form to form an opening in the initially closed axial end may involve punching.

In some forms, the step of removing material from the initially closed axial end of the tubular body of the precursor form to form an opening in the initially closed axial end may form one or more positioning tabs in the inner periphery of the opening. Such position tabs might be useful to position the compression collar on the end of the pipe on which it will be received so that the collar is not, for example, slid past the axial end of the pipe. If there are multiple positioning tabs, then those tabs may be located at even intervals around the inner periphery.

It is contemplated that, in some forms, the opening may have an inner periphery with a profile in axial cross section that matches, in part, an adjacent profile in axial cross section of an inner periphery of the bore with a non-matching part of the profiles providing at least one positioning tab in the inner periphery of the opening.

In some forms, the compression collar may further include a supporting extension or "tail" on the axial end of the compression collar opposite the axial end having the opening that is removed. Such a supporting extension may be configured to reinforce a thinned section of the pipe past the fitting. The supporting extension may have different shapes. For example, in some forms, the supporting extension mat tapers as it extends away from the opening (meaning that the wall thickness decreases). In some other forms, the supporting extension may have a relatively constant wall thickness, although this wall thickness may still be less than the wall thickness of the main portion of the compression collar.

In some forms, the method may further involve, during injection molding, forming flat surfaces on the inner periphery of the bore of the compression collar that are parallel to a central axis of the compression collar. These flat surfaces may be configured to be tangent to a radially-outward facing surface of the pipe around which the compression collar will be received during its attachment to the end of the pipe in forming a connection.

In some forms, the method may further include forming a chamfered edge or a curved corner with a radius of curvature in the bore at the axial end of the bore that is opposite the axial end in which opening is removed.

According to another aspect, a compression collar is disclosed for reinforcing an interference fit between an end of a pipe and a fitting. The compression collar includes a tubular body formed by injection molding a cold-expansion material in which the tubular body has a bore extending axially therethrough and a removed opening on one initially-closed axial end of the tubular body in which the removed opening connects to the bore. The opening has an inner periphery with a profile in axial cross section that is different than any profile in axial cross section of an inner periphery of the bore.

In some forms, the cold-expansion material may be one or more of a polyolefin, cross-linked polyolefin, polyethylene, cross-linked polyethylene, PEX, PEX-a, PEX-b, PEX-c, and PERT.

In some forms, the compression collar includes no knit-lines and no residual injection points from injection molding.

In some forms, the compression collar may further include flat surfaces on the inner periphery of the bore that are parallel to a central axis of the compression collar such that the flat surfaces are configured to be tangent to a radially-outward facing surface of the pipe around which the compression collar is to be received. In some forms, the removed opening may include positioning tabs and there may be as many flat surfaces on the inner periphery as there are positioning tabs.

In some forms, the compression collar may further include a supporting extension or "tail" on the axial end of the compression collar opposite the axial end having the opening that is removed. Such a supporting extension may be configured to reinforce a thinned section of the pipe past the fitting. The supporting extension may have different shapes. For example, in some forms, the supporting extension mat tapers as it extends away from the opening (meaning that the wall thickness decreases). In some other forms, the supporting extension may have a relatively constant wall thickness, although this wall thickness may still be less than the wall thickness of the main portion of the compression collar.

In some forms, the compression collar may further include a chamfered edge or a curved corner with a radius of curvature in the bore at the axial end of the bore that is opposite the removed opening.

In some forms of the compression collar, the inner periphery of the removed opening includes one or more positioning tabs in which the positioning tab(s) is/are configured to axially position the compression collar on an end of a pipe.

In some forms, the removed opening may have an inner periphery with a profile in axial cross section that matches, in part, an adjacent profile in axial cross section of an inner periphery of the bore and with a non-matching part of the profiles defining one or more positioning tabs in the inner periphery of the removed opening.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

BRIEF DESCRIPTION OF THE DRAWINGS

FIG. 1A is a perspective view of a precursor form with a closed end from injection molding that is further manufactured into a collar.

FIG. 1B is a side plan view of the precursor form of FIG. 1A.

FIG. 1C is a cross-sectional side view of the precursor form of FIG. 1A taken through line 1C-1C of FIG. 1B.

DETAILED DESCRIPTION

Figure 2A:
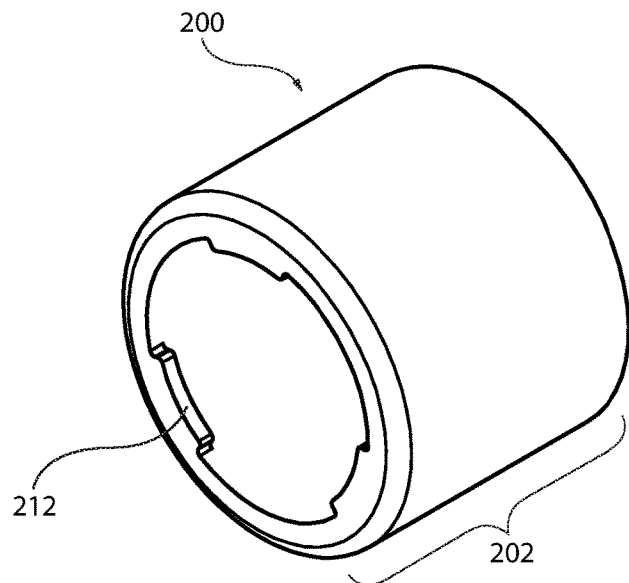
FIG. 2A is a perspective view of the compression collar form from the precursor form of FIGS. 1A-1C after a material removing operation.

FIGS. 1A-1C show one example embodiment of a precursor form 100 which is further processed to form a compression collar 200 which may also be referred to as a reinforcing ring. It is noted that similar features between the precursor form 100 and the collar 200 (which is effectively a further manufactured form of the precursor form 100) will have similar reference numbers, except that the leading "1" or "2" will be alter the reference numbers from the 100 series to the 200 series.

Looking first at FIGS. 1A-1C, the precursor form 100 is shown as it has been injection molded. The precursor form 100 may be formed from cold-expansion material comprising polyolefin, cross-linked polyolefin, polyethylene, cross-linked polyethylene, PEX, PEX-a, PEX-b, PEX-c, PERT, and/or any other material exhibiting memory properties such that at room temperature the material may be stretched and immediately or shortly thereafter allowed to shrink back down to the material's previous shape before the stretching operation. Materials with this property may be advantageously used in creating interference or frictional fits or joints because of the forces exerted by the material on any object, which is larger than the material's normal shape, and over which the material is stretched, placed, and allowed to shrink. Thus, depending on the amount of stretching and the thickness of the material, strong squeezing forces exerted by the material on an object may cause the object to remain in place and resist becoming dislodged by other forces. Additionally, the high elongation before break or flexibility of the material allows for elastic stretching rather than cracking or tearing.

The precursor form 100 may have an overall tubular shape with a cylindrical bore formed through one end of the cylindrical shape with an initially closed axial end 108 at the opposing end, having been injection molded with an axial length 102, an inner diameter 104, and an outer diameter 106. This makes the bore initially a blind bore. The cylindrical bore of the precursor form 100 is formed in the one end of the cylindrical shape that will be slid over the end of a section of pipe in use. In order to facilitate sliding the final collar 200 over the pipe, an end chamfer 120 (as illustrated in FIGS. 2B and 2C) may be formed at the opened axial end of the bore of the precursor preform 100. Alternatively, the end chamfer 120 may be formed as a curved corner having a certain radius of curvature. The radius of curvature may vary. The closed axial end 108 is located at the axial opposing end of the precursor form 100 which corresponds to the axial end that will be arranged closest to the end of the piping in use.

The desired axial length 102 of the precursor form 100 may be based on the inner and outer diameters 104, 106 and/or the intended use of the compression collar 200 manufactured from the precursor form 100. For example, the inner diameter 104 of the precursor form 100 may range from about a ¼" to about 6" in order to just fit or slide over the outer diameter of standard cold-expansion pipe for residential or commercial applications. Additionally, the compression collar 200 resulting fabricated from the precursor form 100 may be certified under the ASTM F1960 standard and may be used with standard manual pipe expanders or even automatic expander power tools, such as the M12™ 12V Cordless Lithium-Ion ProPEX® Expansion Tool by Milwaukee Electric Tool®, for example.

The formation of the closed axial end or continuous gate 108 at the end of the precursor form 100 during injection molding may be facilitated by using a fan gate or other similar gate, such as a sprue gate or submarine gate, for example. A fan gate injection point 110 is preferably located at the center of the closed end 108 corresponding with the central axis of the precursor form 100. The mold for the precursor form 100 of the compression collar 200 may be arranged such that the closed end 108 is located at the top. In this way, the injection molding material flowing through the central gate injection point 110 has a single front that flows radially outward and then substantially uniformly down and around the whole mold to fill in the tubular-shaped sidewall of the precursor form 100. Because there is only one material front flowing around and down into the mold, no knitlines are formed where the flowing materials meet. This advantageously eliminates any potential weak points in the final compression collar 200 that may tear when subjected to expanding forces or that may otherwise have to be reinforced.

After molding, the material comprising the closed axial end 108 of the precursor form 100 is then removed to form an opening (i.e., a removed opening) that is connected to the bore. In order to remove the material from the closed axial end 108 of the precursor form 100, cutting, trimming, punching, or similar known operations may be performed. As a non-limiting example, material may be removed or punched from the initially closed axial end 108 of the precursor form 100 by using a die on a punch press. The die is shaped to match the material to be removed from the closed end 108.

Figure 2B:
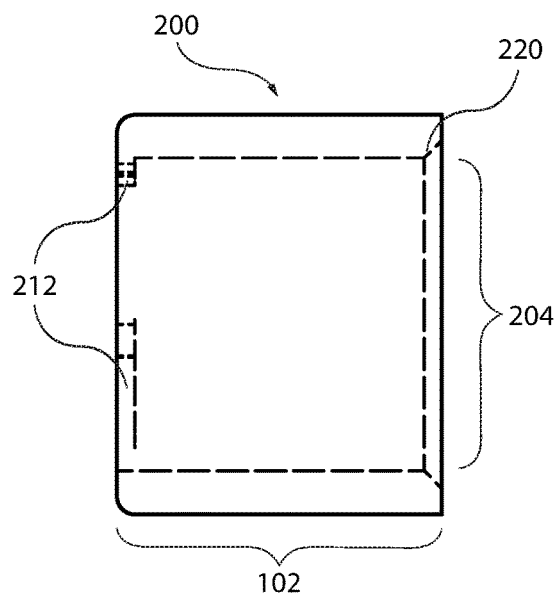
FIG. 2B is a side plan view of the compression collar of FIGS. 2A.
Figure 2C:
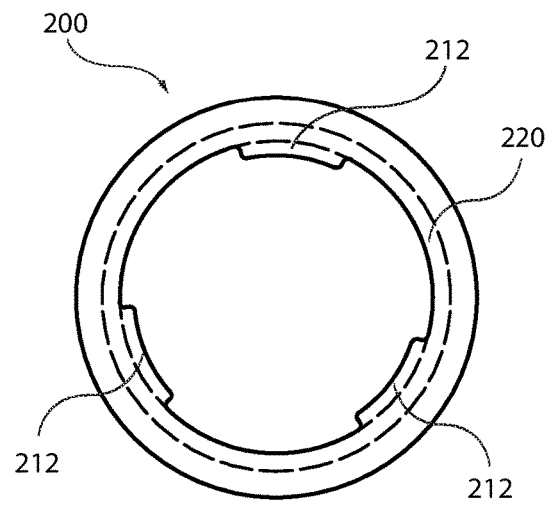
FIG. 2C is a front axial plan view of the compression collar of FIGS. 2A.

Rather than remove the closed end 108 material completely, some material may be left to function as positioning tabs or stops 212, as seen in FIGS. 2A-2C. The positioning tabs 212 advantageously position the compression collar 200 on the piping or fitting over which the compression collar 200 is to be placed. Thus, the thickness of the positioning tabs 212 (i.e., the axial thickness of the closed end 108) may be based on the inner diameter 204 and/or the outer diameter 206 of the compression collar 200. Alternatively or additionally, the thickness of the positioning tabs 212 may be based on a thickness and/or outer diameter of the pipe and/or fitting over which the compression collar 200 is to be placed. For example, the positioning tabs 212 may be about ¹⁄₉₆" up to about ¹⁄₁₆" thick for fitting over pipe with a ½" outer diameter.

The positioning tabs 212 may vary in height (measured axially) and are not limited to the embodiment shown in FIGS. 2A-2C. The height of the positioning tabs 212 may be based on the efficiency of the material removal operation and/or the cost of materials. Additionally, the height of the positioning tabs 212 may be based on the nominal inner diameter 204 and/or the outer diameter 206 of the compression collar 200. Alternatively or additionally, the height of the positioning tabs 212 may be based on a thickness and/or outer diameter of the piping and/or fitting over which the compression collar 200 is to be placed.

Similarly to the height, the shape of the positioning tabs 212 may vary and are not limited to the embodiment shown in FIGS. 2A-2C. The shape of the positioning tabs 212 may be based on the efficiency of the material removal operation and/or the cost of materials. For example, the positioning tabs 212 may taper to a point moving toward the center of the compression collar 200. As another non-limiting example, the positioning tabs 212 may remain substantially the same width moving toward the center of the compression collar 200. The positioning tabs 212 may each have a different shape and/or alternate shapes. For example, there may be one positioning tab with a tapering shape and the remaining positioning tabs have a more rectangular shape such that the positioning tab with the tapering shape marks one side of the compression collar for orientation, alignment, and/or registration purposes.

The positioning tabs 212 may vary in width from the embodiment shown in FIGS. 2A-2C. The width of the positioning tabs 212 may be based on the number of positioning tabs 212 to be formed by the material removal operation. For example, a larger width may be employed for a lower number of positioning tabs and/or a smaller width may be employed for a higher number of positioning tabs. The positioning tabs may differ from each other in widths as described above with respect to shape variations of the positioning tabs in the compression collar.

As an alternative to the plurality of positioning tabs 212, there may be only one positioning tab. The single positioning tab may vary in width from the positioning tabs 212 shown in FIGS. 2A-2C. For example, the single positioning tab may have a width that extends around about a quarter or half of the circumference of the inner bore of the compression collar 200. As another non-limiting example, the single positioning tab may extend around the majority of the circumference of the inner bore of the compression collar.

Figure 3A:
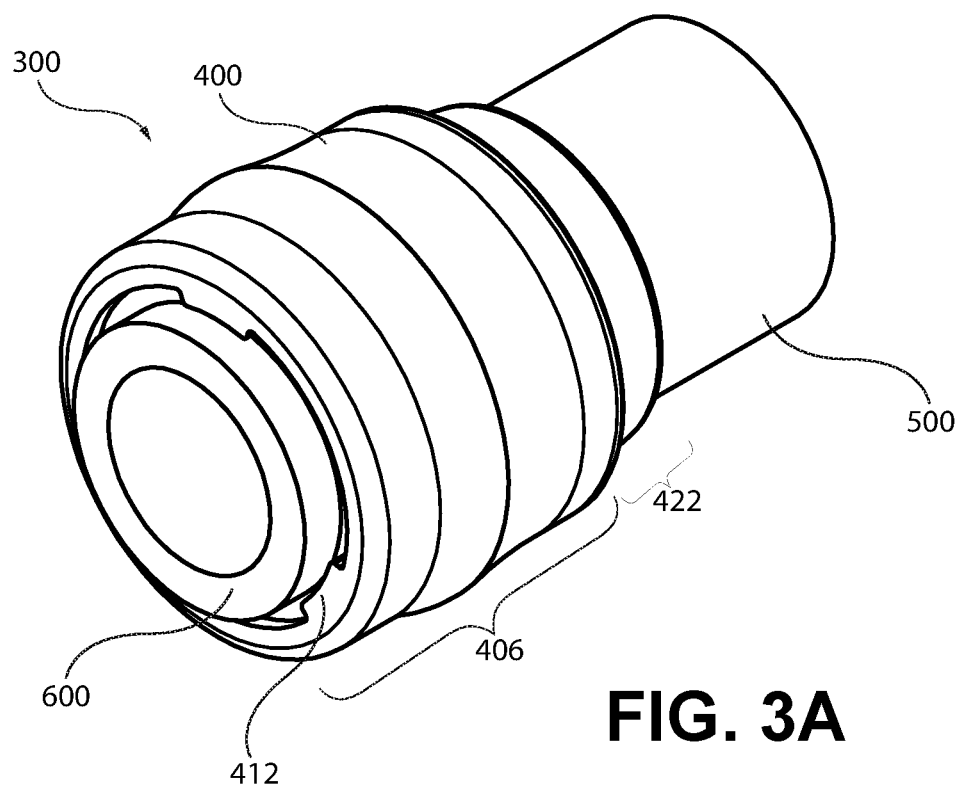
FIG. 3A is a perspective view of a connection made using another compression collar, after the collar has been put on the end of a pipe, the pipe and collar have been cold expanded and placed over a fitting, and the pipe and collar have compressed around the fitting to form a seal.
Figure 3B:
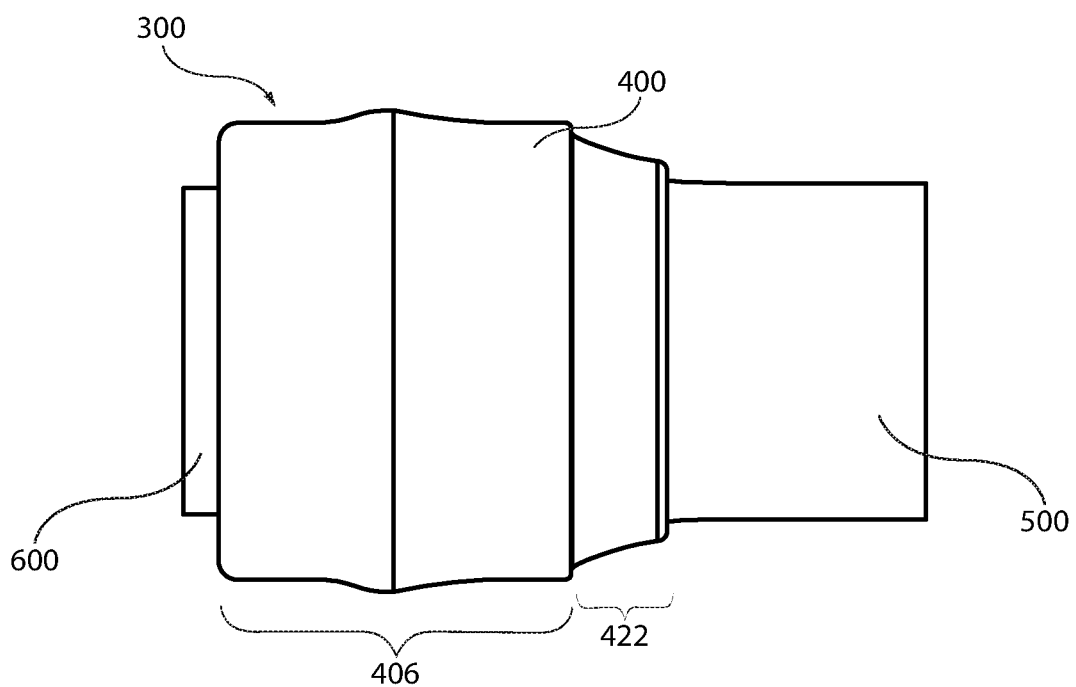
FIG. 3B is a plan side of the connection of FIG. 3A.
Figure 3C:
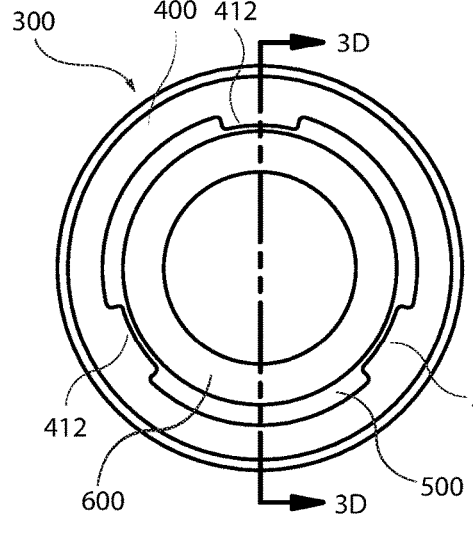
FIG. 3C is a front axial end plan view of the connection of FIG. 3A.
Figure 3D:
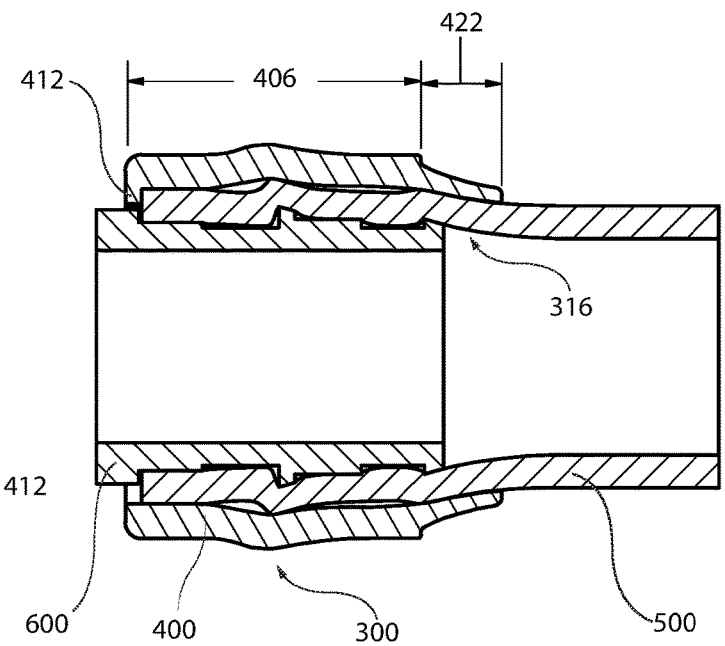
FIG. 3D is a cross-sectional side view of the connection of FIG. 3A, taken through line 3D-3D of FIG. 3C.
Figure 4A:
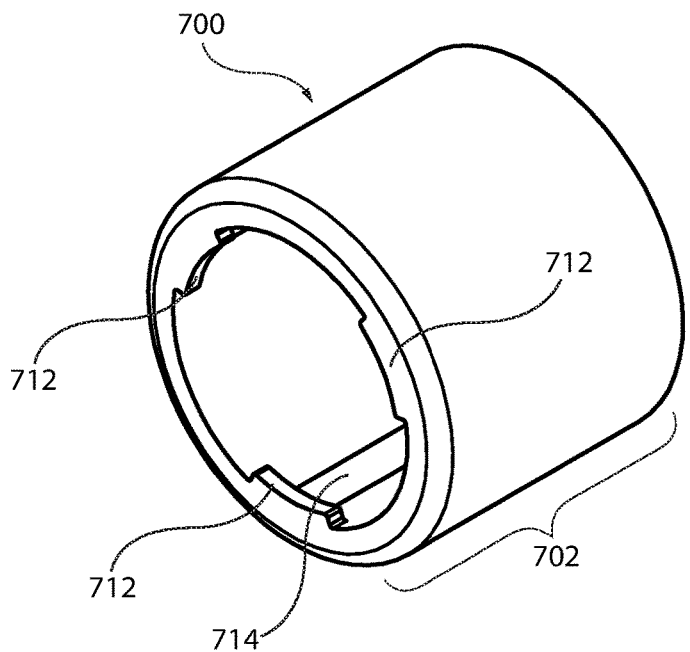
FIG. 4A is a perspective view of yet another compression collar in which the central bore has flats.
Figure 4B:
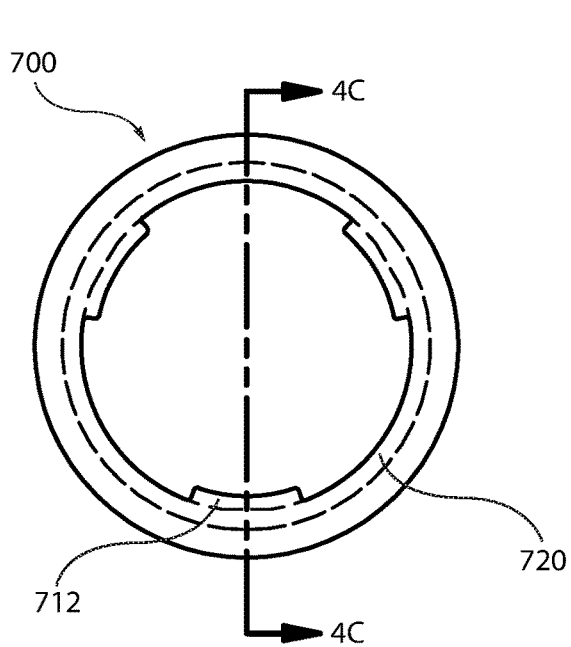
FIG. 4B is a front axial end plan view of the collar of FIG. 4A.
Figure 4C:
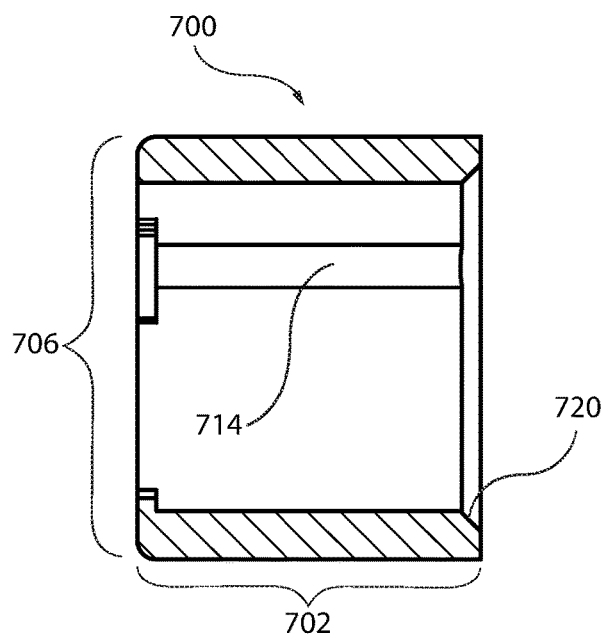
FIG. 4C is a cross-sectional side view of the compression collar of FIG. 4A, in which the section is taken through line 4C-4C of FIG. 4B.
Figure 4D:
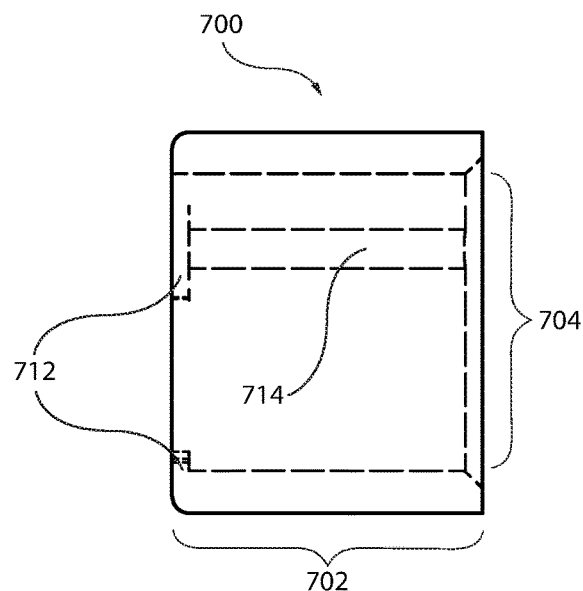
FIG. 4D is a side plan view of the compression collar of FIG. 1A.
Figures 4E, 4F:
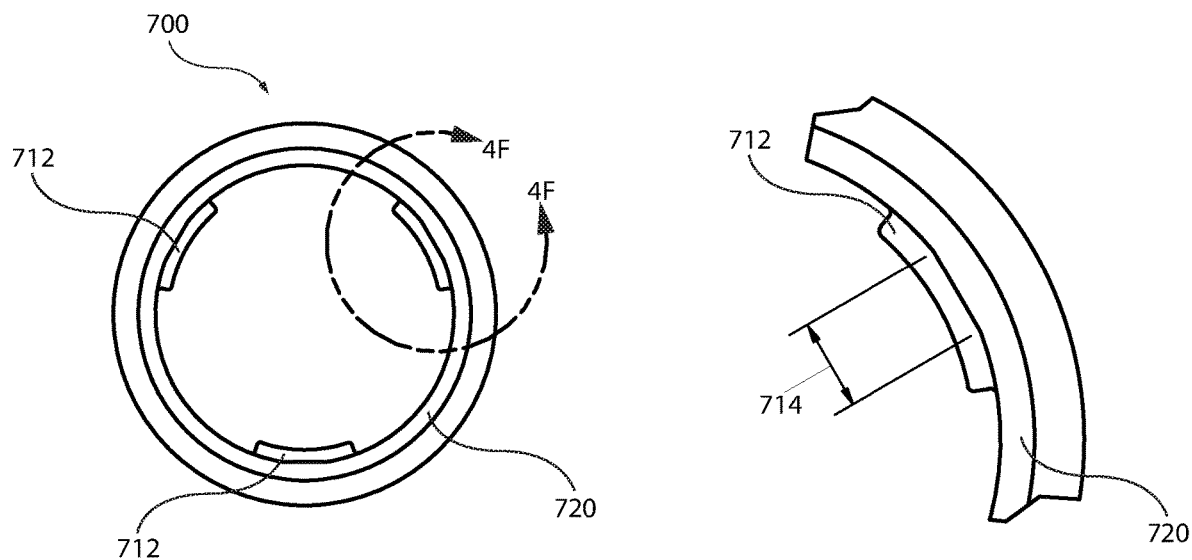
FIG. 4E is a rear axial end plan view of the collar in FIG. 4A.
FIG. 4F is a detailed view of the compression collar of FIG. 4A taken in area 4F-4F of FIG. 4E, looking into the rear bore end to further impress the positioning of the flat relative to the positioning tab.

FIGS. 3A-3D show a connection 300 formed between another compression collar 400 that has been placed over a pipe 500 which are collectively slid over a fitting 600. Collar 400 is identical to collar 200, except that it further has a supporting extension 422 or "tail." As best seen in FIG. 3D, the compression collar 400 is shown after being placed over the end of a section of pipe 500, being coaxially cold expanded with the pipe 500, being placed over the fitting 600 (i.e., axially slid onto the fitting 600 is a still-expanded condition), and being allowed to shrink back over a fitting 600.

The compression collar 400 includes positioning tabs 412 as well as a supporting extension 422 that extends beyond a nominal length 406 of the compression collar 400. The supporting extension 422 may taper in wall thickness moving from the region of nominal length 406 toward the end. Alternatively, the supporting extension 422 may maintain the same wall thickness.

In production, the supporting extension 422 may be incorporated into the compression collar 400 during injection molding, as described above. The combined lengths of the nominal length 406 of the compression collar 400 and the supporting extension 422 may be based on the desired wall thickness and the inner and outer diameters of the compression collar 400, the intended use of the compression collar 400, and/or the type and insertion length of the fitting 600.

The supporting extension 422 may advantageously provide additional strength and external support for an area 316 of the connection 300 where the pipe 500 meets the axial end of the fitting 600. In this area 316, the wall of the pipe 500 may be stretched or thinned due to the expansion joining process. Thus, providing the compression collar 400 with the supporting extension 220 surrounding this area 316 may reduce the hydrostatic stress in the wall of the pipe 500, increasing the pressure capability of the pipe 500 and bringing the margin of safety for practical applications back up to at least the original design limits. In this way, the compression collar 400 can provide not only extra compressive force at the sealing interface on the fitting 600 to prevent the connection 300 from leaking, but also additional external support for the pipe 500 in the area 316 of potential weakening just beyond the inserted length of the fitting 600.

FIGS. 4A-4F show yet another exemplary embodiment of a compression collar 700, which is similar to collar 200 (where the reference numbers in the 700 series again correspond to the reference numbers from the 200 series) but in which there are flats 714 form in the radially inward facing surface of the bore. The compression collar 700 may be injection molded and as such is shown after the material removing operation described above with respect to the precursor form 100 and collar 200. The compression collar 700 has an axial length 702, an inner diameter 704, and an outer diameter 706. The compression collar 700 includes positioning tabs 712, as described above, that prevent the end of a section of piping from sliding completely through the collar 700. The end of the compression collar 700 that slides over the end of the piping may include chamfering 720 formed into the inner diameter 704. This chamfering 720 may facilitate initial entry of the piping into the inner diameter 704 of the compression collar 700. Alternatively, the chamfering 720 may be formed as a curved corner having a certain radius of curvature. The radius of curvature may vary.

Additionally included on the compression collar 700 is one or more flat surfaces or strips 714 that are axially tangent to the pipe over which the collar 700 is placed in use. These flat surfaces 714 may be formed on the inner wall of the cylindrical bore during the injection molding process. The flat surfaces 714 advantageously provide a slight amount of friction for a lightly snug fit between the compression collar 700 and the radially outward facing surface of the pipe that will keep the collar 700 from sliding off the pipe prior to expansion. A further advantage of the flat surfaces 714 is that they are parallel with the central axis of the compression collar 700 such that the same slight amount of friction is applied evenly all along the end of the section of pipe which is inserted into the collar 700.

The flat surfaces 714 may vary in width and are not limited to the embodiment shown in FIGS. 4A-4F. The width of the flat surfaces 714 may be based on the inner diameter 704 and/or the outer diameter 706 of the compression collar 700. Alternatively or additionally, the width of the flat surfaces 714 may be based on a thickness and/or outer diameter of the pipe and/or fitting over which the compression collar 700 is to be placed. The width of the flat surfaces 714 may be based on the number of flat surfaces 714. For example, a larger width may be employed for a lower number of flat surfaces 714 and/or a smaller width may be employed for a higher number of flat surfaces 714. The flat surfaces 714 may each have a different width and/or alternate widths. For example, there may be one flat surface 714 with a larger width and the remaining flat surfaces 714 have smaller widths such that the flat surface 714 with the larger width marks one side of the compression collar 700 for orientation, alignment, and/or registration purposes.

The number of flat surfaces 714 may be based on the width of the flat surfaces 714, the inner and outer diameters 704, 706 of the compression collar 700, the outer diameter of the pipe over which the collar 700 is to be placed, and/or the number of positioning tabs 712. The flat surfaces 714 may be evenly distributed around the inner diameter 704 of the compression collar 700 or alternatively distributed unevenly. The flat surfaces 714 may be aligned and/or misaligned with the positioning tabs 712. As an alternative to the plurality of flat surfaces 714, there may be only one flat surface. The single flat surface may vary in width from the flat surfaces 314 shown in FIGS. 4A-4F.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A compression collar for reinforcing an interference fit between an end of a pipe and a fitting, the compression collar comprising:
    an injection molded tubular body formed of a cold-expansion material, the cold-expansion material biased toward a relaxed position from an expanded position, the tubular body having
        a pipe insertion end, the pipe insertion end including an insertion opening defined therein,
        a stop end opposite the pipe insertion end, the stop end including a stop opening defined therein, the stop opening bounded by a cut edge of the cold-expansion material,
        a central axis extending axially through the pipe insertion end and the stop end,
        a radially inner surface defining a bore extending along the central axis through the tubular body, a majority of the radially inner surface formed as a continuous straight line extending along the central axis and projecting circumferentially about the central axis, the bore in fluid communication with the insertion opening and the stop opening,
        a radially outer surface spaced radially outwardly from the radially inner surface, a majority of the radially outer surface formed as a continuous straight line extending along the central axis and projecting circumferentially about the central axis; and
    wherein the cut edge bounding the stop opening has at least one portion that is positioned radially inwardly relative to the radially inner surface of the tubular body, and
    wherein the compression collar includes no knitlines.

2. The compression collar of claim 1, wherein the cold-expansion material is at least one of polyolefin, cross-linked polyolefin, polyethylene, cross-linked polyethylene, PEX, PEX-a, PEX-b, PEX-c, and PERT.

3. The compression collar of claim 1, wherein the compression collar includes no injection points from injection molding.

4. The compression collar of claim 1, wherein
    the radially inner surface further includes a plurality of flat surfaces,
    each flat surface is separated from a circumferentially adjacent flat surface by a trough,
    each flat surface extends along the axial direction of the tubular body such that the flat surfaces are configured to be tangent to a radially-outward facing surface of the pipe around which the compression collar is received.

5. The compression collar of claim 4, wherein
    the stop opening includes positioning tabs,
    the radially inner surface includes as many flat surfaces as there are positioning tabs, and
    each flat surface has a width that is shorter than a width of a corresponding positioning tab.

6. The compression collar of claim 5, wherein each flat surface extends along the axial direction from the corresponding positioning tab to a chamfered edge defining a portion of the bore at the pipe insertion end.

7. The compression collar of claim 1, wherein the compression collar further comprises a supporting extension for reinforcing the piping past the fitting, the supporting extension being positioned on the pipe insertion end of the compression collar.

8. The compression collar of claim 7, wherein the supporting extension tapers as it extends away from the stop opening.

9. The compression collar of claim 1, further comprising a chamfered edge defining a portion of the bore at the pipe insertion end.

10. The compression collar of claim 1, further comprising a curved corner with a radius of curvature defining a portion of the bore at the pipe insertion end.

11. The compression collar of claim 1, wherein the at least one portion of the cut edge bounding the stop opening includes at least one positioning tab in which the at least one positioning tab is configured to axially position the compression collar on the end of the pipe.

12. The compression collar of claim 11, wherein the at least one positioning tab includes a plurality of positioning tabs.

13. The compression collar of claim 1, wherein the cut edge bounding the stop opening has at least one other portion that is flush with the radially inner surface.

14. The compression collar of claim 1, wherein the radially inner surface includes an injection molded radially inner surface.

15. The compression collar of claim 1, wherein the radially outer surface includes an injection molded radially outer surface.

16. The compression collar of claim 1, wherein the pipe insertion end is an injection molded pipe insertion end.

17. The compression collar of claim 1, further comprising a wall thickness extending radially from the radially inner surface to the radially outer surface, the wall thickness being substantially constant along the axial direction of the tubular body.

18. The compression collar of claim 1, wherein the stop end includes a stop end outer face, the stop end outer face being an injection molded face, and the stop opening is defined in the stop end outer face.

19. The compression collar of claim 1, wherein the continuous straight line of the radially outer surface extends from the pipe insertion end of the tubular body to a position radially outward from an interface of the cut edge and the radially inner surface.

20. The compression collar of claim 1, wherein the cold-expansion material includes PEX-b.

21. The compression collar of claim 20, wherein the cold-expansion material is made entirely of PEX-b.

22. A compression collar for reinforcing an interference fit between an end of a pipe and a fitting, the compression collar comprising:
- an injection molded tubular body formed of a cold-expansion material, the cold-expansion material biased toward a relaxed position from an expanded position, the tubular body having
    - a pipe insertion end, the pipe insertion end including an insertion opening defined therein,
    - a stop end opposite the pipe insertion end, the stop end including a stop opening defined therein, the stop opening bounded by a cut edge of the cold-expansion material, and
    - a radially inner surface defining a bore extending along an axial direction through the tubular body, the radially inner surface being an injection molded inner surface, the bore in fluid communication with the insertion opening and the stop opening; and
- wherein the cut edge bounding the stop opening has at least one portion that is positioned radially inwardly relative to the radially inner surface of the tubular body, and
- wherein the compression collar includes no knitlines and no injection points from injection molding.

23. The compression collar of claim 22, wherein the cold-expansion material includes PEX-b.

24. The compression collar of claim 23, wherein the cold-expansion material is made entirely of PEX-b.

* * * * *